Figure 3:
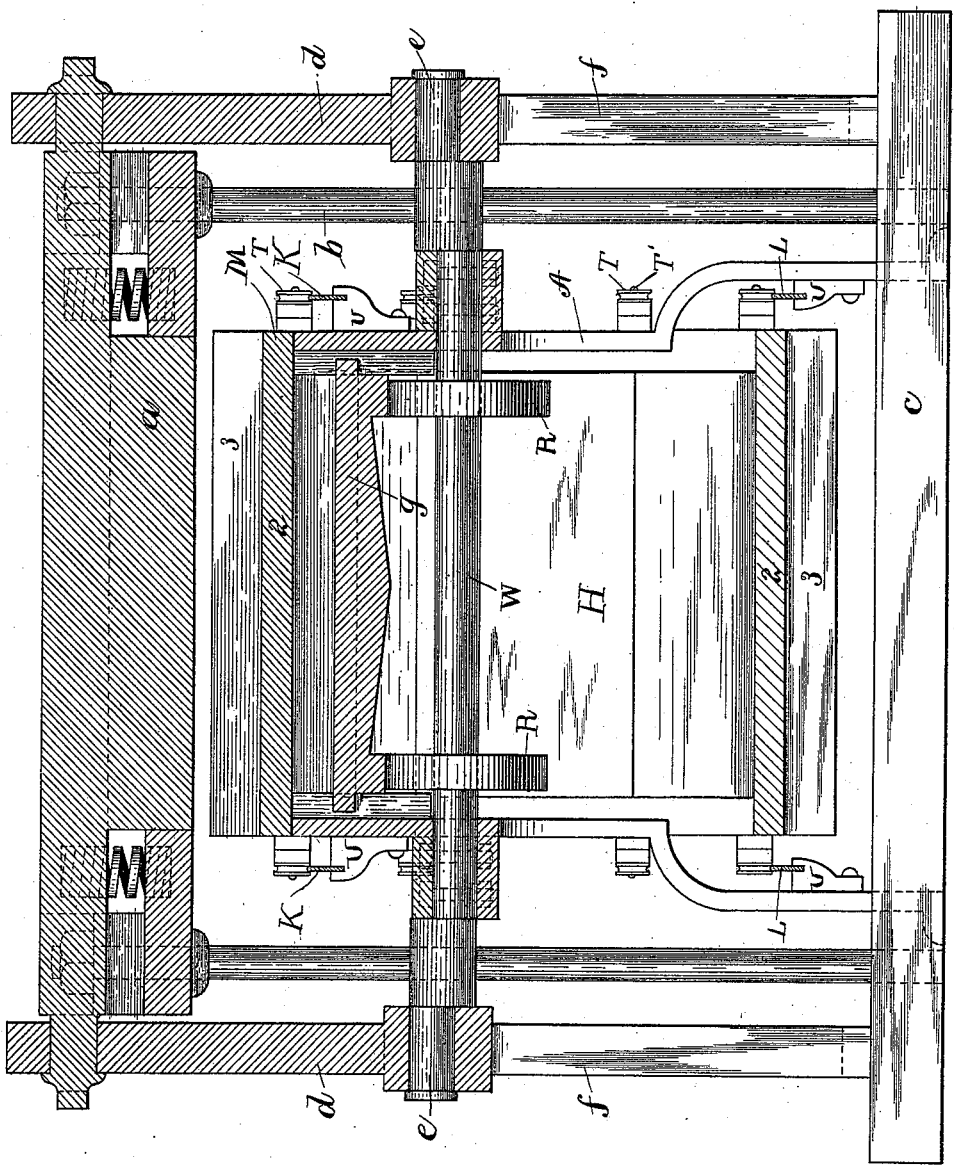

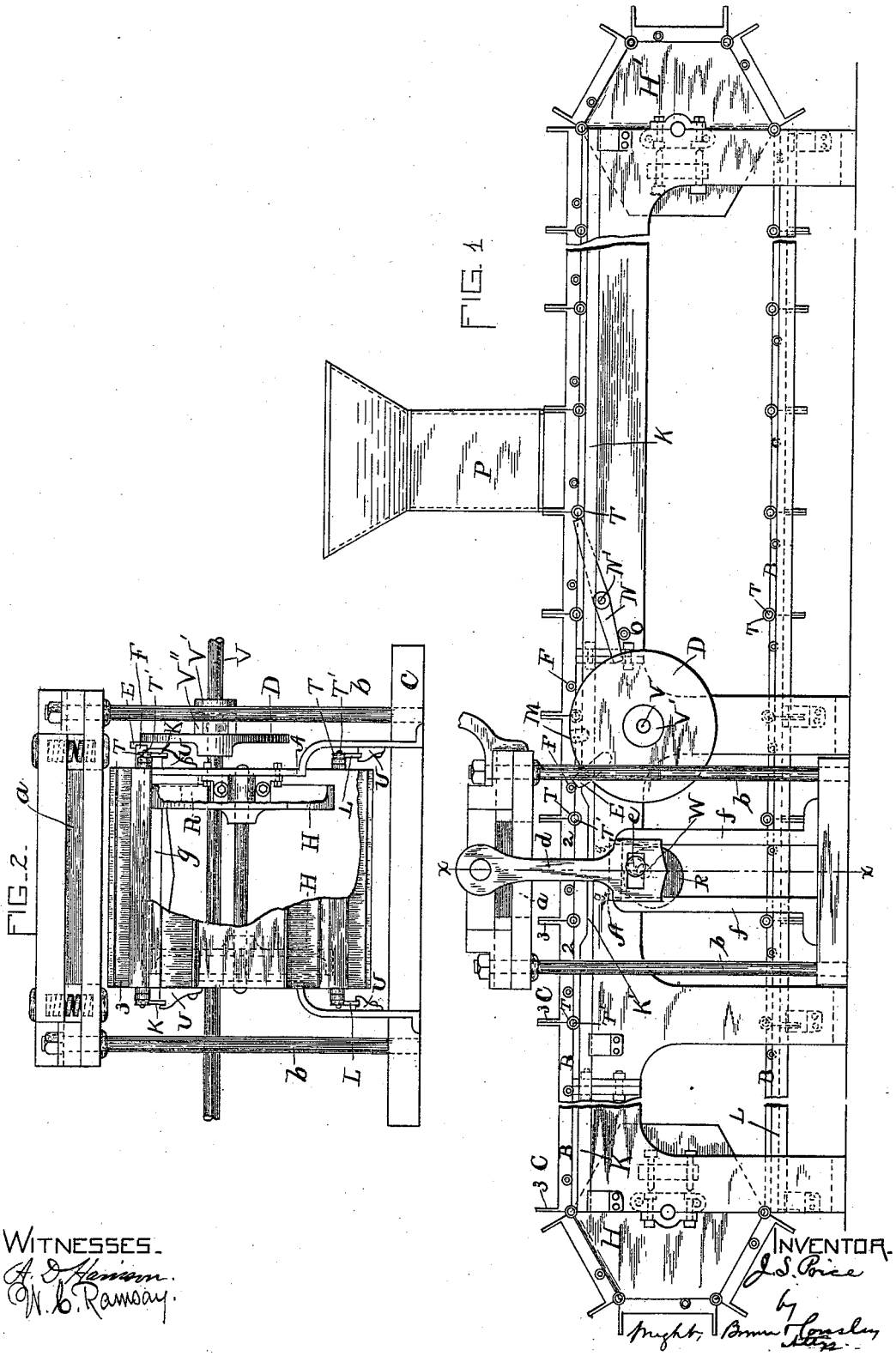
(No Model.)  2 Sheets—Sheet 1.
J. S. PRICE.
MACHINE FOR FORMING COTTON SEED MEAL INTO CAKES.
No. 429,544. Patented June 3, 1890.

(No Model.) 2 Sheets—Sheet 2.

J. S. PRICE.
MACHINE FOR FORMING COTTON SEED MEAL INTO CAKES.

No. 429,544. Patented June 3, 1890.

WITNESSES INVENTOR

UNITED STATES PATENT OFFICE.

JAMES S. PRICE, OF HOUSTON, TEXAS.

MACHINE FOR FORMING COTTON-SEED MEAL INTO CAKES.

SPECIFICATION forming part of Letters Patent No. 429,544, dated June 3, 1890.

Application filed July 27, 1889. Serial No. 318,813. (No model.)

*To all whom it may concern:*

Be it known that I, JAMES S. PRICE, of Houston, in the county of Harris and State of Texas, have invented certain new and useful Improvements in Machines for Forming Cotton-Seed Meal into Cakes, of which the following is a specification.

This invention relates to an organized machine adapted to compress charges of cotton-seed meal into cakes of sufficient solidity to bear handling and removal to the press which expresses the oil from the meal, and to carry said cakes from the point where they are compressed to a point or points in convenient proximity to the press or presses which express the meal.

In my application for Letters Patent of the United States, Serial No. 308,660, I have shown a machine for the purpose above indicated, having a horizontal slide or carriage on which are a series of molds, which are charged with cotton-seed meal by the movement of the carriage under a meal-supplying chute or hopper. Said carriage is moved progressively step by step to bring the molds successively under a vertically-movable press platen or follower, and is arrested and held after each forward movement while the platen descends and compresses the charge of meal in the mold under it, the carriage being moved forward another step after the platen rises, and so on, until the charge in the last mold is compressed. The compressed charges are removed from the molds and transferred to a press by attendants, the forward movement of the carriage conveying the cakes from the point where they are compressed or formed to convenient proximity to the press. When all the charges in the molds have been compressed and removed, the motion of the carriage is reversed, and it is run back to its starting-point, the operation above described being then repeated.

In the machine shown in this application an endless chain or series of molds is substituted for the reciprocating carriage and its molds shown in my above-mentioned application, said endless chain being moved continuously along suitable guides or tracks and around polygonal drums at the ends of the supporting-frame, so that the machine may be continuously operated and the delay incidental to the return of the before-mentioned carriage to its starting-point avoided.

The invention consists in the combinations of parts hereinafter described and claimed, comprising an organized machine for the purpose above stated.

Of the accompanying drawings, forming a part of this specification, Figure 1 represents a side elevation of my improved machine. Fig. 2 represents an end view. Fig. 3 represents a section on line $x\ x$, Fig. 1.

The same letters of reference indicate the same parts in both of the figures.

In the drawings, A represents the supporting-frame, to which are affixed horizontal tracks K K L L, extending lengthwise of the frame at the sides thereof, the tracks K being at the upper portion of the frame, while the tracks L are below the tracks K. Said tracks are supported by brackets U, suitably attached to the frame A.

B B represent the molds, which are arranged in an endless chain or series. Each mold is composed of a flat plate or bed 2, having vertical flanges 3 3 at two of its edges, the meal cake being formed in the space C between said flanges 3 and over the bed 2. The molds are connected in an endless chain, of which the beds 2 of the molds are the links or members. Any suitable hinge or joint connection may be employed to connect each mold to the next. Each hinge or joint has a rod or trunnion T', and on said trunnions are mounted grooved wheels T, which run on the tracks K L, the molds being therefore supported by said tracks.

H H' represent polygonal drums journaled in bearings at the ends of the frame A and supporting the endless chain of molds at their turning-points.

V represents a shaft journaled in bearings on the frame A and rotated by power applied in any suitable way. Loosely mounted on said shaft is the disk D, which when rotated gives to the series of dies their step-by-step motion by the contact of a lug or arm E, affixed to said disk, with rollers F, mounted on studs on the ends of the molds B, the lug E and rollers F being so arranged that the lug strikes a roller at a given point in its revolution, and through said roller moves the chain of molds forward a distance equal to the width of one mold and then leaves said roller, the chain of molds remaining at rest until the lug in its revolution reaches the next roller F.

The shaft V has a sliding clutch V', which is connected with the shaft by a feather or otherwise, so that it rotates with the shaft. The hub of the disk D has a clutch V'', formed to engage the clutch V', and when the clutch V' is moved into engagement with the clutch V'' the disk D is positively rotated and caused to impel the chain of molds step by step, as above described.

To exactly define the limit of each forward motion, a stop is provided, consisting of a lever N, pivoted at N' to the frame A and normally standing in such position that one of its arms will strike one of the rollers T and arrest the forward movement of the chain. The other arm of said lever stands within the path of a lug M on the disk D, said lug being arranged to strike the lever N and throw it out of its normal position, thus releasing the roller T, previously held thereby, just before the lug E strikes another roller F to move the chain of molds forward. After the lug M passes the lever N the latter resumes its normal position, in which it is retained by a stop O.

The described devices for impelling the molds step by step and for arresting them after each forward movement are shown in substantially the same form and arrangement in my former application, in which the rollers T are applied to the edges of the sliding carriage.

$a$ represents the platen or follower which compresses the charges of meal in the molds. Said platen is fitted to move vertically on guides or standards $b$, which rise from the bed or base $c$. The platen is connected at its ends by stout connecting-rods $d$ with cranks $e\ e$ on a shaft W, which is driven by power communicated through suitable gearing from the shaft V or otherwise, said cranks playing in horizontal slots in the lower ends of the rods $d$, so that they give vertical but not lateral motion to said rods.

$f\ f$ represent vertical guides, between which the lower ends of the rods $d$ move.

$g$ represents a vertically-movable bed which is located between the shaft W and the platen $a$ and below the molds which pass between said shaft and platen. Said bed rests on eccentrics R R, affixed to the shaft W, and is raised and lowered by the rotation of said eccentrics, the arrangement being such that the bed $g$ is raised and caused to support the mold above it while the charge in said mold is being compressed by the platen $a$. The tracks K K and rollers T are therefore not subjected to the pressure exerted by the platen, said pressure being sustained by the bed $g$, eccentrics R R, shaft W, and the bearings of said shaft. The tracks K K are preferably lowered, as shown at K', so that the rollers of the mold with which the platen $a$ co-operates do not bear on said tracks, said mold being thereby enabled to yield slightly to the pressure of the platen, and thus come to a firm bearing on the bed $g$ without strain on the tracks K and rollers T.

The meal is supplied to the molds by a chute P, leading from a hopper, which may be supplied by a conveyer. The chute P is arranged just over the line along which the upper edges of the flanges 3 3 of the molds move, so that the lower end of the chute serves as a striking-edge to level the meal in the molds.

In the operation of the machine the chain of molds is moved step by step in the manner described, each mold being thus caused to pass under the chute P to receive a charge of meal and then brought to position under the platen. At each stoppage of the chain of molds a mold is in position to receive the platen and is so held while the platen is descending and solidifying the charge of meal into a cake, the bed $g$ being elevated meanwhile to support the pressure. When the platen rises the bed $g$ falls, and after the platen has withdrawn from the mold the chain is moved forward another step, and so on.

The cakes of meal are drawn endwise from the molds by attendants and placed in presses located in any convenient relation to the machine. Each mold is preferably somewhat wider at one end than at the other, so that the cake can be easily removed by drawing it from the wider end. The wider end of each mold alternates with the narrower ends of the adjoining molds. The difference between the width of the ends of the molds is so slight that a platen of uniform width may be used, or, if preferred, there may be two tapered platens located side by side with their wider and narrower ends alternating, so that they will closely fit the tapered molds. In this case each forward movement or step of the chain of molds will be equal to the width of two molds. The empty molds pass down over the drum H and return to the starting end of the machine along the tracks L L and over the drum H'. It will be seen, therefore, that the operation of the machine is continuous, no time being lost in returning the molds to their starting-point after they are emptied.

The arrangement of the molds in an endless chain, besides saving time in the operation of the machine, enables the length of the machine to be reduced and its construction simplified in that no mechanism is required for reversing the movement of the molds. The bearings of the drums H H' are preferably adjustable, so that any lost motion or slack in the endless chain of molds may be taken up.

The machine may be provided with the devices described in my former application for folding the ends of cloth wrappers over the ends of the charges of meal, said devices being arranged in the same relation to the series of molds here shown that they are to the molds shown in the other application.

I do not in this application claim the invention shown, described, and claimed in my former application.

I am aware that brick-machines have been made in which are combined a series of molds arranged in an endless chain, a charging-hopper, and a reciprocating platen to compress the charges in the mold, as shown in Patent No. 82,492; hence I do not claim such combination broadly.

I claim—

1. In a machine for forming cotton-seed meal into cakes, a series or chain of open ended molds composed of an endless series of flat plates 2, pivotally connected with each other and constituting the bottoms of the molds and provided with trucks or rollers T at their ends, and the vertical flanges 3 3 at the edges of said plates, said flanges constituting the sides of the molds, the ends of said molds being unobstructed or open to permit the endwise removal of the cakes formed in said molds, combined with drums engaged with the chain of molds, a frame supporting said drums and molds and provided with tracks K L, arranged to support the rollers T, means, substantially as described, for moving said chain progressively step by step, a meal-chute arranged to charge the molds, and a reciprocating platen whereby the charges are compressed in the molds, as set forth.

2. The combination of a series of molds arranged in an endless chain, means for supporting and guiding said chain, a reciprocating press-platen arranged over the chain of molds, a reciprocating bed arranged under the platen and under the mold presented thereto, and means for simultaneously raising the bed to support a mold and depressing the platen to press the charge in the supported mold, as set forth.

3. The combination of a series of molds arranged in an endless chain and provided with trucks or rollers, a vertically-movable press-platen arranged over the chain of molds, a vertically-movable bed arranged under the platen and under the mold presented thereto, means for simultaneously raising the bed and depressing the platen, and a supporting-frame having tracks arranged to support the rollers on the chain of molds, said tracks being lowered at points coinciding with the press-platen, as set forth.

4. The combination of the endless chain or series of molds, the supporting-frame, means for moving said chain step by step, the vertically-movable press-platen over the series of molds, the vertically-movable bed $g$ under the molds, and the shaft W, having cranks $e\ e$, connected by rods $d\ d$ with the platen, and eccentrics R R, supporting the bed $g$, all arranged and operating substantially as set forth.

In testimony whereof I have signed my name to this specification, in the presence of two subscribing witnesses, this 29th day of June, A. D. 1889.

JAMES S. PRICE.

Witnesses:
 J. E. MEASHAN,
 SAML. M. MCASHAN.